(12) United States Patent
Pueschner et al.

(10) Patent No.: US 11,681,888 B2
(45) Date of Patent: Jun. 20, 2023

(54) SENSOR DEVICE, METHOD OF FORMING A SENSOR DEVICE, CHIP CARD AND METHOD OF FORMING A CHIP CARD

(71) Applicant: Infineon Technologies AG, Neubiberg (DE)

(72) Inventors: Frank Pueschner, Kelheim (DE); Walther Pachler, Graz (AT); Josef Gruber, Sankt Ruprecht an der Raab (AT); Jens Pohl, Bernhardswald (DE); Stephan Rampetzreiter, Graz (AT); Thomas Spoettl, Mintraching (DE); Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 3 days.

(21) Appl. No.: 17/075,730

(22) Filed: Oct. 21, 2020

(65) Prior Publication Data

US 2021/0117743 A1    Apr. 22, 2021

(30) Foreign Application Priority Data

Oct. 22, 2019  (DE) ..................... 10 2019 128 464.3

(51) Int. Cl.
*G06K 19/07* (2006.01)
*G06K 19/077* (2006.01)
*G06V 40/13* (2022.01)

(52) U.S. Cl.
CPC ... *G06K 19/0718* (2013.01); *G06K 19/07701* (2013.01); *G06K 19/07756* (2013.01); *G06K 19/07775* (2013.01); *G06V 40/1306* (2022.01)

(58) Field of Classification Search
CPC .......... G06K 19/0002; G06K 19/0718; G06K 19/07354; G06K 19/07701; G06K 19/07756; G06K 19/07775; G06K 19/07794; G06K 19/0716; G06K 19/077; G06K 19/07749; G06K 19/07773; G06K 19/0775

See application file for complete search history.

(56) References Cited

U.S. PATENT DOCUMENTS

| 9,396,379 | B2 | 7/2016 | Sløgedal et al. |
| 10,783,337 | B2 * | 9/2020 | Mosteller ................ G06F 21/32 |
| 2008/0223925 | A1 * | 9/2008 | Saito .................... G06Q 20/341 |
| | | | 235/380 |
| 2016/0004947 | A1 | 1/2016 | Pueschner et al. |

(Continued)

FOREIGN PATENT DOCUMENTS

| DE | 102013102003 A1 | 8/2014 |
| SE | 1750836 A1 | 12/2018 |

(Continued)

OTHER PUBLICATIONS

Office Action issued for the corresponding German Application No. 102019128464.3, dated Jun. 19, 2020, 8 pages (for informational purposes only).

*Primary Examiner* — Thien M Le
*Assistant Examiner* — April A Taylor
(74) *Attorney, Agent, or Firm* — Viering, Jentschura & Partner MBB

(57) ABSTRACT

A sensor device is provided that includes a fingerprint sensor and an antenna coupled with the fingerprint sensor for inductive coupling of the fingerprint sensor with a booster antenna.

15 Claims, 10 Drawing Sheets

(56) References Cited

U.S. PATENT DOCUMENTS

| | | | |
|---|---|---|---|
| 2019/0171923 A1* | 6/2019 | Finn | B32B 7/12 |
| 2019/0228279 A1* | 7/2019 | Gac | G06K 19/0702 |
| 2020/0051061 A1* | 2/2020 | Gandolfo | H02J 50/23 |
| 2020/0184173 A1* | 6/2020 | Jiang | G06K 19/0723 |
| 2021/0081748 A1* | 3/2021 | Finn | G06K 19/07722 |

FOREIGN PATENT DOCUMENTS

| | | |
|---|---|---|
| WO | 2018035258 A1 | 2/2018 |
| WO | 2019004905 A1 | 1/2019 |

\* cited by examiner

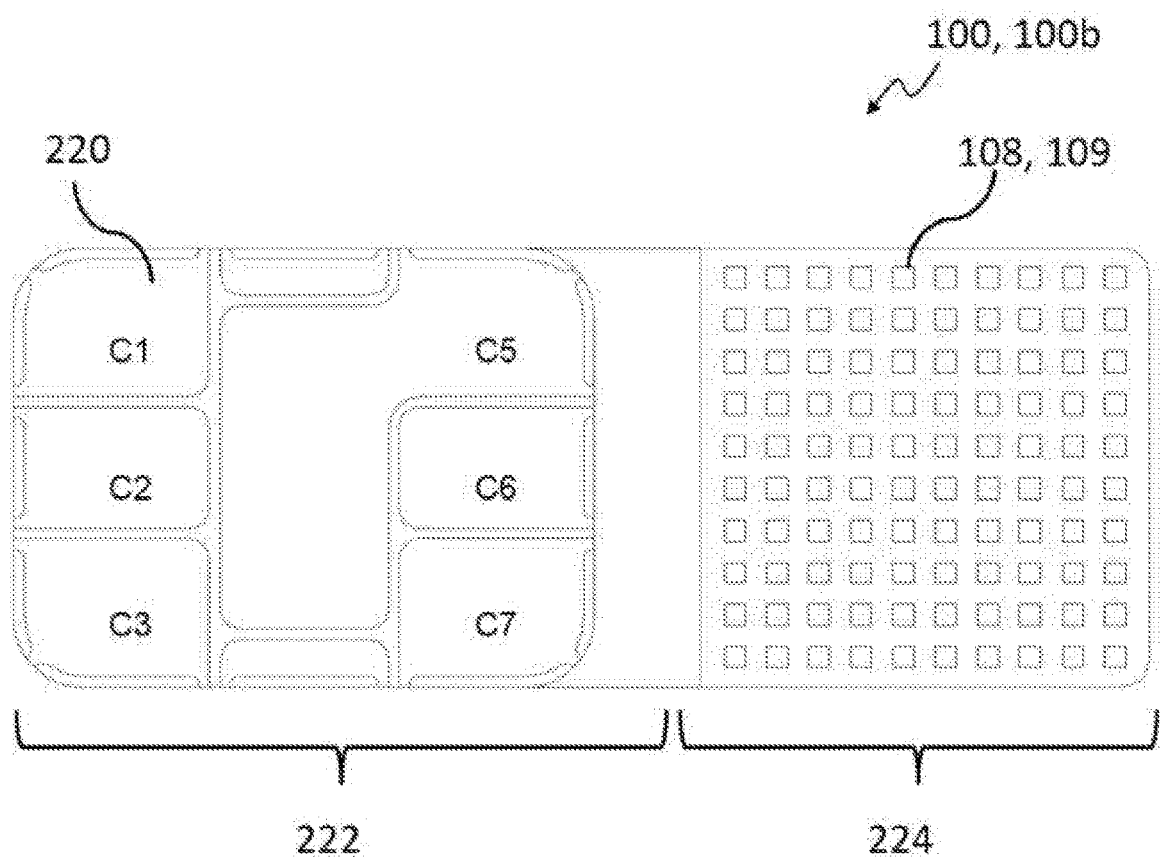
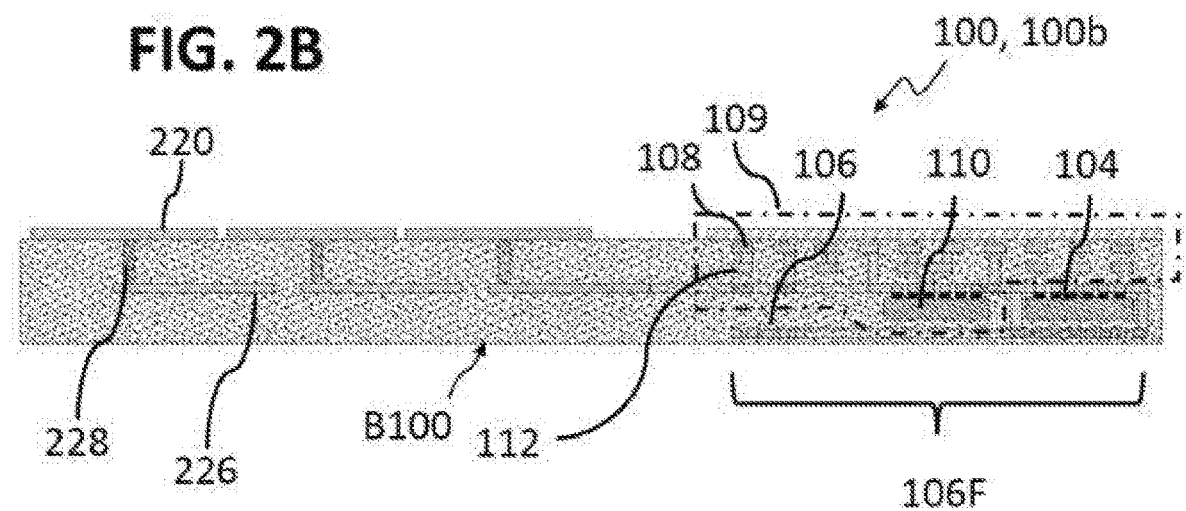

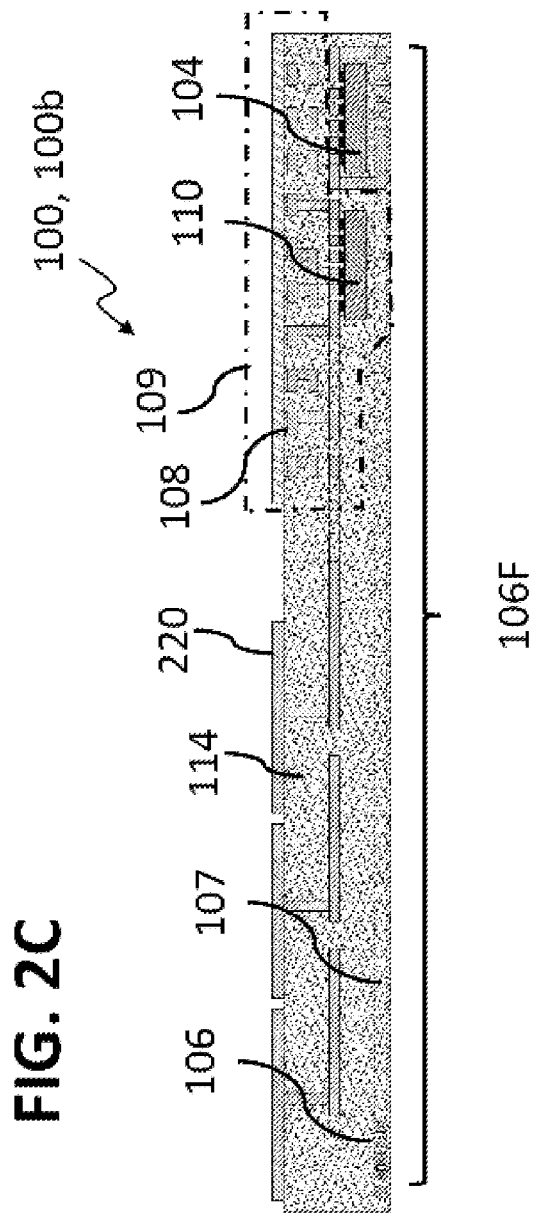

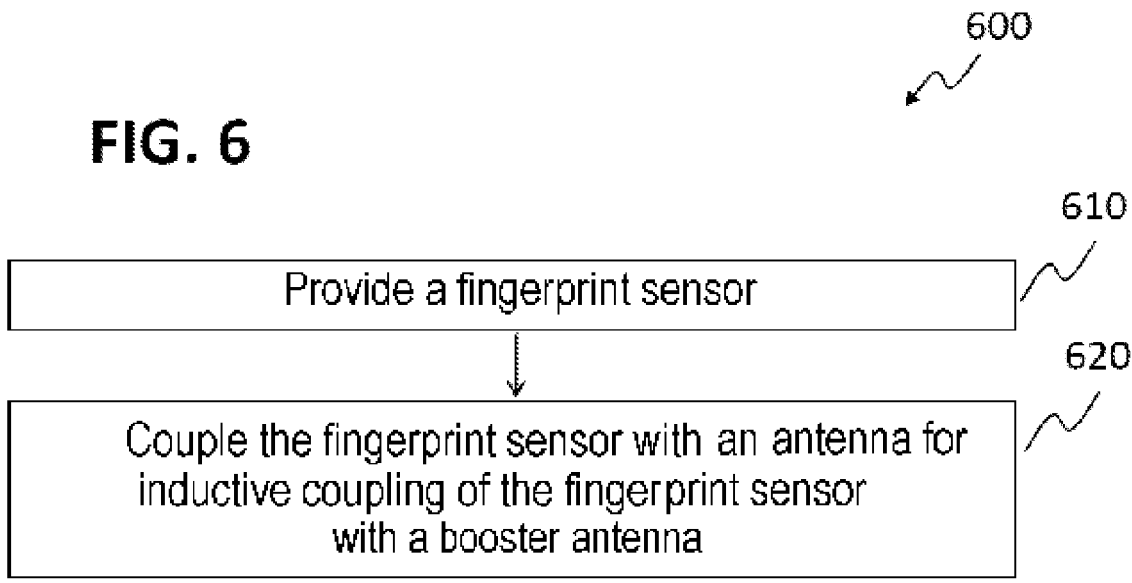
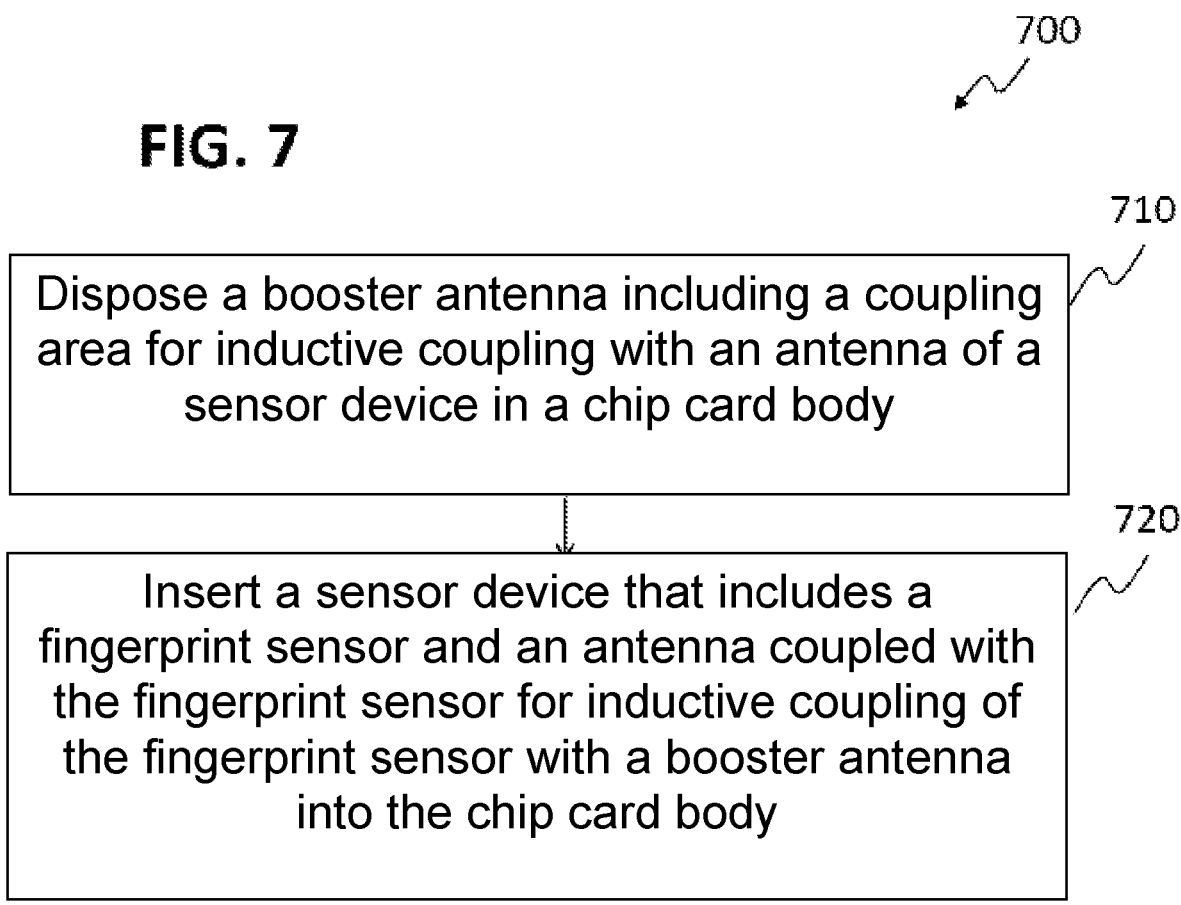

SENSOR DEVICE, METHOD OF FORMING A SENSOR DEVICE, CHIP CARD AND METHOD OF FORMING A CHIP CARD

CROSS-REFERENCE TO RELATED APPLICATION

This application claims priority to German Patent Application Serial No. 10 2019 128 464.3, which was filed Oct. 22, 2019, the contents of which are incorporated herein by reference in their entirety

TECHNICAL FIELD

The invention relates to a sensor device, a method of forming a sensor device, a chip card, and a method of forming a chip card.

BACKGROUND

There is a marked trend nowadays toward chip cards or smart cards, e.g. for banking applications or access permissions, that are provided with biometric sensors, e.g. fingerprint sensors, for authentication.

However, these cards have a complex structure with a plurality of components that are galvanically interconnected. The fingerprint sensor, for example, having a chip (which can provide security-relevant functions and is then referred to as a secure element) can be connected in an electrically conductive manner to an antenna.

For broad acceptance, applications for the mass market, such as e.g. payment/banking applications, must, on the one hand, be inexpensive and, on the other hand, must meet prescribed reliability or security requirements, e.g. they must comply with the specifications of the CQM standards in respect of mechanical reliability.

In the prior art, different fingerprint sensors have been proposed that differ in terms of sensor type, sensor material and smartcard assembly method.

U.S. Pat. No. 9,396,379 B2 describes a fingerprint sensor that has a flexible unit with embedded electrically conductive areas that form a sensor array, i.e. a two-dimensional arrangement of individual sensor points. The signal provided by the sensor array is evaluated by a processor unit that is connected in an electrically conductive manner to the sensor array. External contacts are further provided with which the sensor is connected to other electrical structures, e.g. to an RFID antenna and a chip card module circuit that is similarly integrated into the smart card body.

The mechanical-electrical connections between the sensor device, the RFID antenna and the chip card module circuit can represent a disadvantage here. These connections can require special connection technologies, e.g. soldering or adhesion with an anisotropic electrically conductive adhesive, e.g. an anisotropic conductive adhesive (ACA) or anisotropic conductive paste (ACP), and/or additional connection elements (e.g. additional printed circuit boards (PCBs, which can also be flexible/pliable, known as flex PCBs), and/or conductive wires/lines. All of this can result in the smart card structure being complex, expensive, and mechanically unreliable.

SE 175 836 A1 describes a fingerprint module that has a fingerprint sensor that is fitted into an opening of a substrate and is connected in an electrically conductive manner to an RFID antenna that is used for both communication and energy production for the sensor.

However, the antenna described in SE 175 836 A1 is relatively large, since it must meet contactless data transmission requirements that are specified in relevant standards (e.g. ISO 14443, CQM, EMVco). With increasing antenna size, production costs also increase. In addition, larger modules perform less well in mechanical reliability tests and are actually also less reliable (in the long term) in use.

BRIEF DESCRIPTION OF THE DRAWINGS

Aspects of the disclosure of the invention are shown in the figures and are explained in detail below.

In the drawing:

FIG. 2A shows a schematic top view of the front side of a sensor device according to different aspects of the disclosure;

FIGS. 2B and 2C in each case show a schematic cross-section view of an example embodiment of the sensor device from FIG. 2A;

FIG. 6 is a flow diagram of a method of forming a sensor device according to different aspects of the disclosure; and FIG. 7 is a flow diagram of a method of forming a sensor device according to different aspects of the disclosure.

DESCRIPTION

Figure 1A:
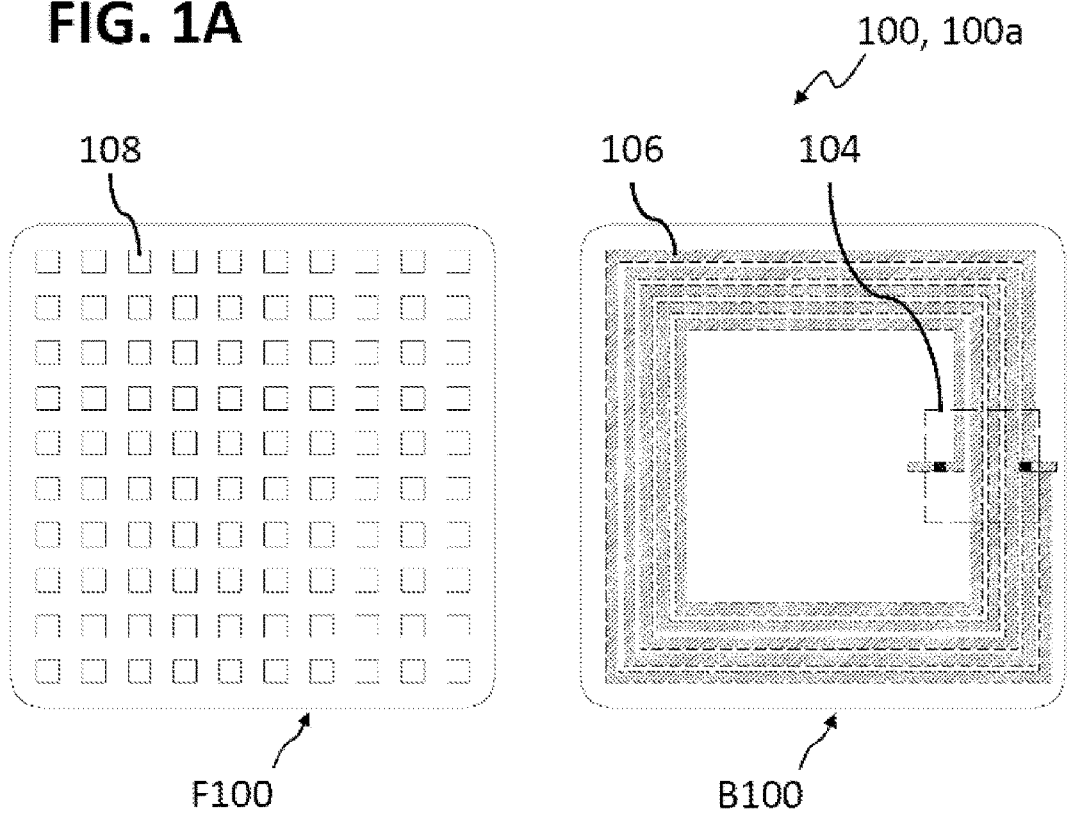
FIG. 1A shows schematic top views of the front side and the rear side of a sensor device according to different aspects of the disclosure.

In the following detailed description, reference is made to the attached drawings that form part thereof and in which specific aspects of the disclosure in which the invention may be implemented are shown by way of illustration. In this respect, direction terminology, such as "above", "below", "in front", "behind", "front", "rear", etc., is used in relation to the orientation of the described figure(s). Since components of aspects of the disclosure may be positioned in a number of different orientations, the direction terminology serves for illustration and is in no way limiting. Other aspects of the disclosure may obviously be used, and structural or logical modifications may be made without departing the protective scope of the present invention. The features of the different aspects of the disclosure described herein may be combined with one another, unless specifically indicated otherwise. The following detailed description is therefore not to be interpreted in a limiting sense, and the protective scope of the present invention is defined by the attached claims.

In the context of this description, the terms "linked", "connected" and "coupled" are used to describe both a direct and an indirect link, a direct or indirect connection, and a direct or indirect coupling. Identical or similar elements are denoted with identical reference numbers in the figures, insofar as this is appropriate.

In order to differentiate between aspects of the disclosure, some apparatuses, devices, components, etc., may also be denoted, in addition to a generic reference number, with a reference number that has the generic reference number suffixed with a lower-case letter.

As described above, a need exists for an inexpensive, reliable biometric sensor (e.g. a fingerprint sensor) that is easily integrable into a chip card (e.g. a smart card).

In different aspects of the disclosure, a sensor device (also referred to as a sensor module) is provided that may include a sensor, e.g. a fingerprint sensor, and an integrated (coupling) antenna.

In different aspects of the disclosure, the sensor module may be inserted into a chip card (e.g. a smart card) that may use a coil-on-module (CoM) technology. In CoM technology, a large antenna (known as a booster antenna) may be present in a card body of the smart card for communication with a smart card reading device and may couple inductively to a (substantially smaller) antenna that may be part of a chip card.

In different aspects of the disclosure, a connection may be set up between the sensor module and a booster antenna disposed in a chip card body by inductive coupling. The inductive coupling may be used for both a data transmission and an energy supply to operate the sensor.

The sensor device may include a sensor array of sensor elements on its front side, e.g. a fingerprint sensor array with connection lines in one layer or a plurality of layers of the printed circuit board (PCB) or a comparable structure.

The sensor device may further include a chip for processing and evaluating the sensor signals, a security controller chip (known as a secure element) with a contactless (CL) interface for authentication/communication with the smart card reading apparatus, and, on its rear side, an antenna for coupling with the coupling coil of the booster antenna. The sensor module may thus dispense entirely with external contacts for the galvanic connection to other electrical or electronic structures.

One advantage of this design may be that an assembly process in which the sensor module may be inserted into the card body may be very simple to design, in fact similar to a contact-based module or a CoM for a dual interface (DiF) module, i.e. through a simple insertion and attachment of the module in the smart card, also referred to as implanting. A hotmelt process, for example, may be used for this purpose.

A sensor device or chip card designed in this way may be mechanically highly reliable, since no electrically conductive connections (e.g. to the booster antenna) are present that could, for example, fail during a reliability test or due to rough handling by a user.

A further advantage of a sensor device or chip card designed in this way may relate to a function, for example an antenna function of the sensor device/chip card, since said function may be good in terms of the relevant standards (ISO, CQM, EMVcO) due to the large antenna surface.

In different aspects of the disclosure, an inexpensive, scalable, reliable, and easily assemblable sensor device, e.g. with a fingerprint sensor, may be provided. In different aspects of the disclosure, the sensor device may be integrated into a chip card, e.g. a smart card. Since the integration into the card may also be performed in a simple and inexpensive manner, the chip card according to different aspects of the disclosure may be similarly inexpensive.

In different aspects of the disclosure, a coil-on-fingerprint sensor module may be provided. This may enable the provision of a complex sensor system as a single package. Improved functionality may be achieved by providing a standard booster antenna in a support in which the coil-on-fingerprint sensor module may be embedded.

In different aspects of the disclosure, size and production costs may be further optimized by leaving out the ISO7816 interface.

Figure 1B:
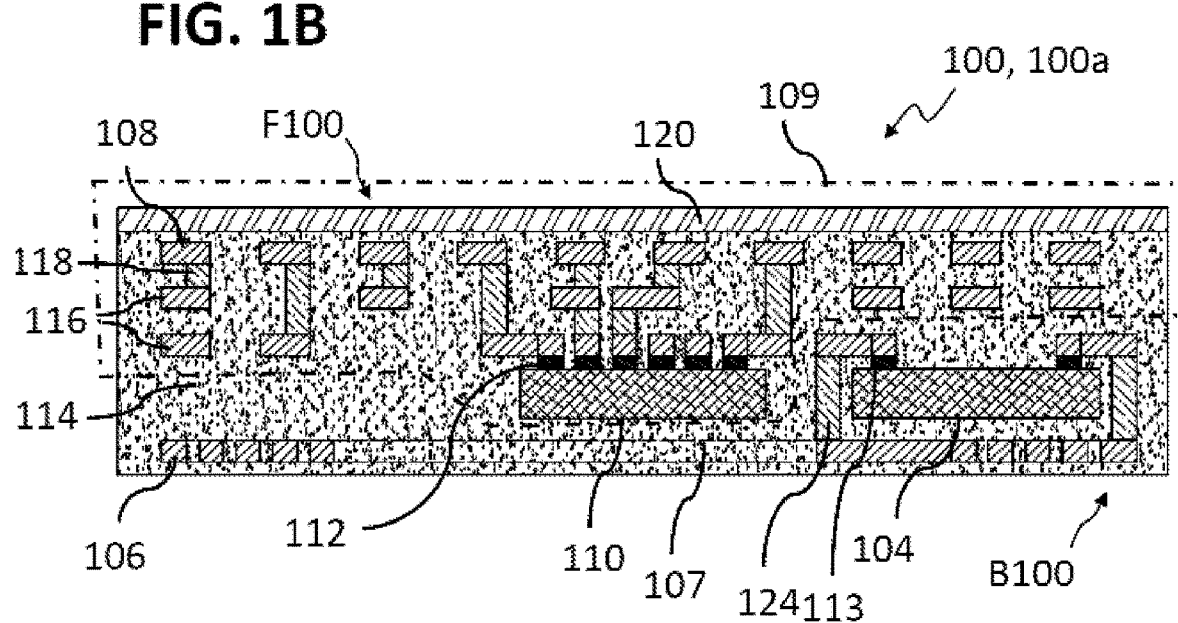
FIGS. 1B, 1C and 1D in each case show a schematic cross-section view of an example embodiment of the sensor device from FIG. 1A.
Figure 1C:
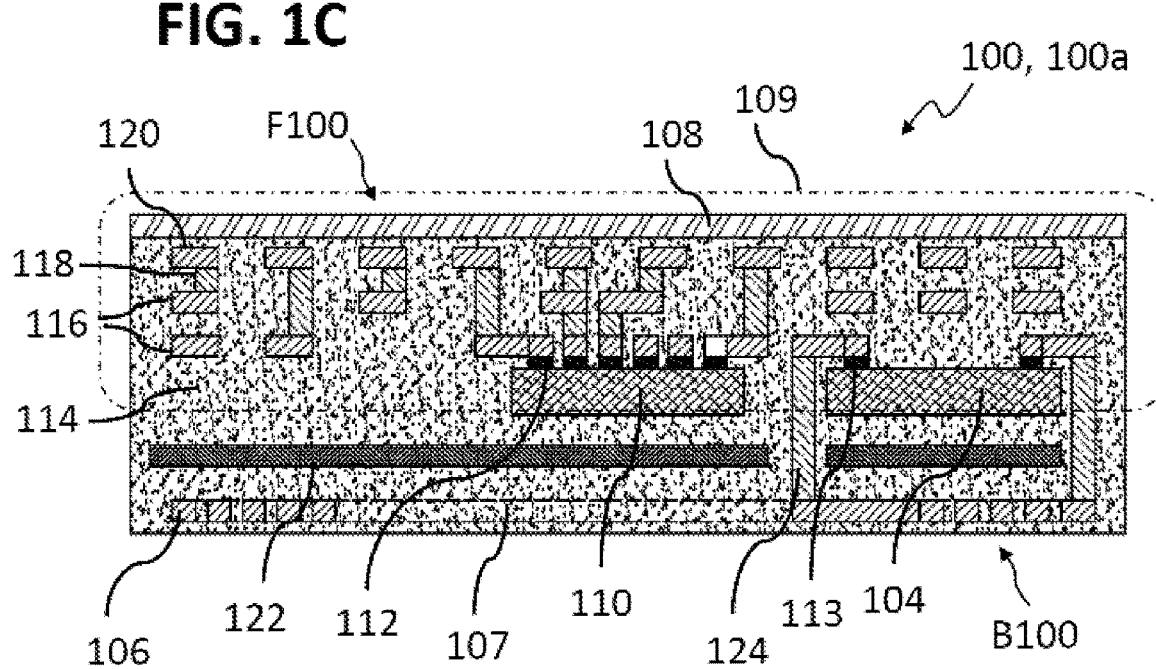
Figure 1D:
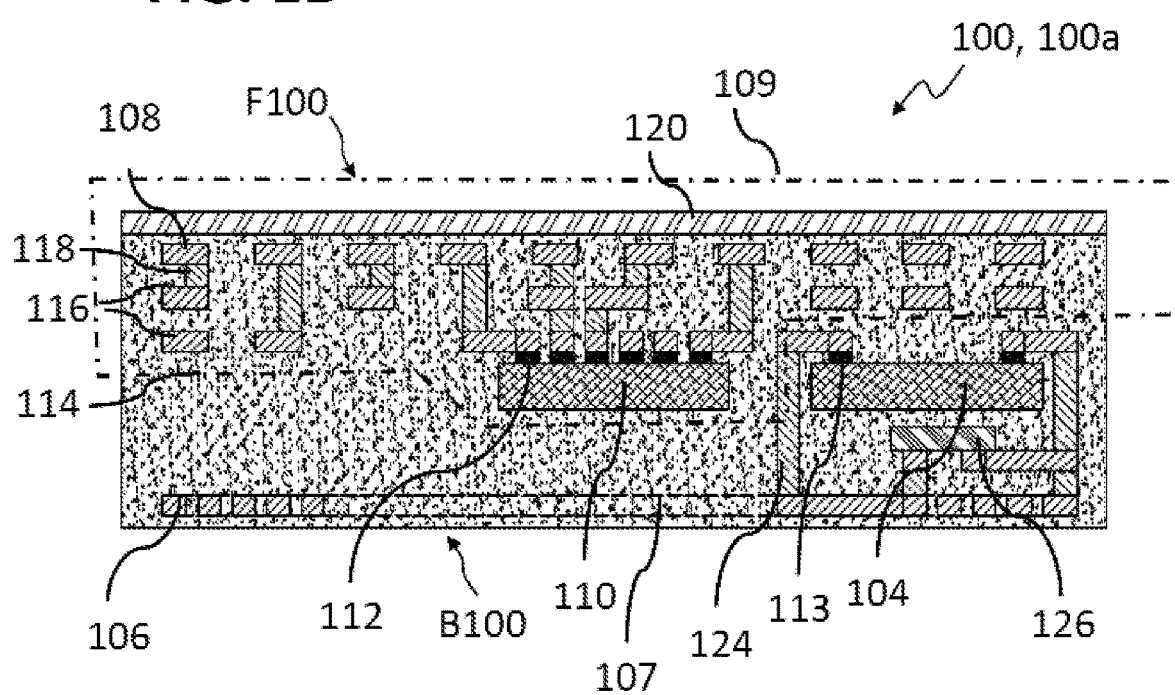
Figure 3:
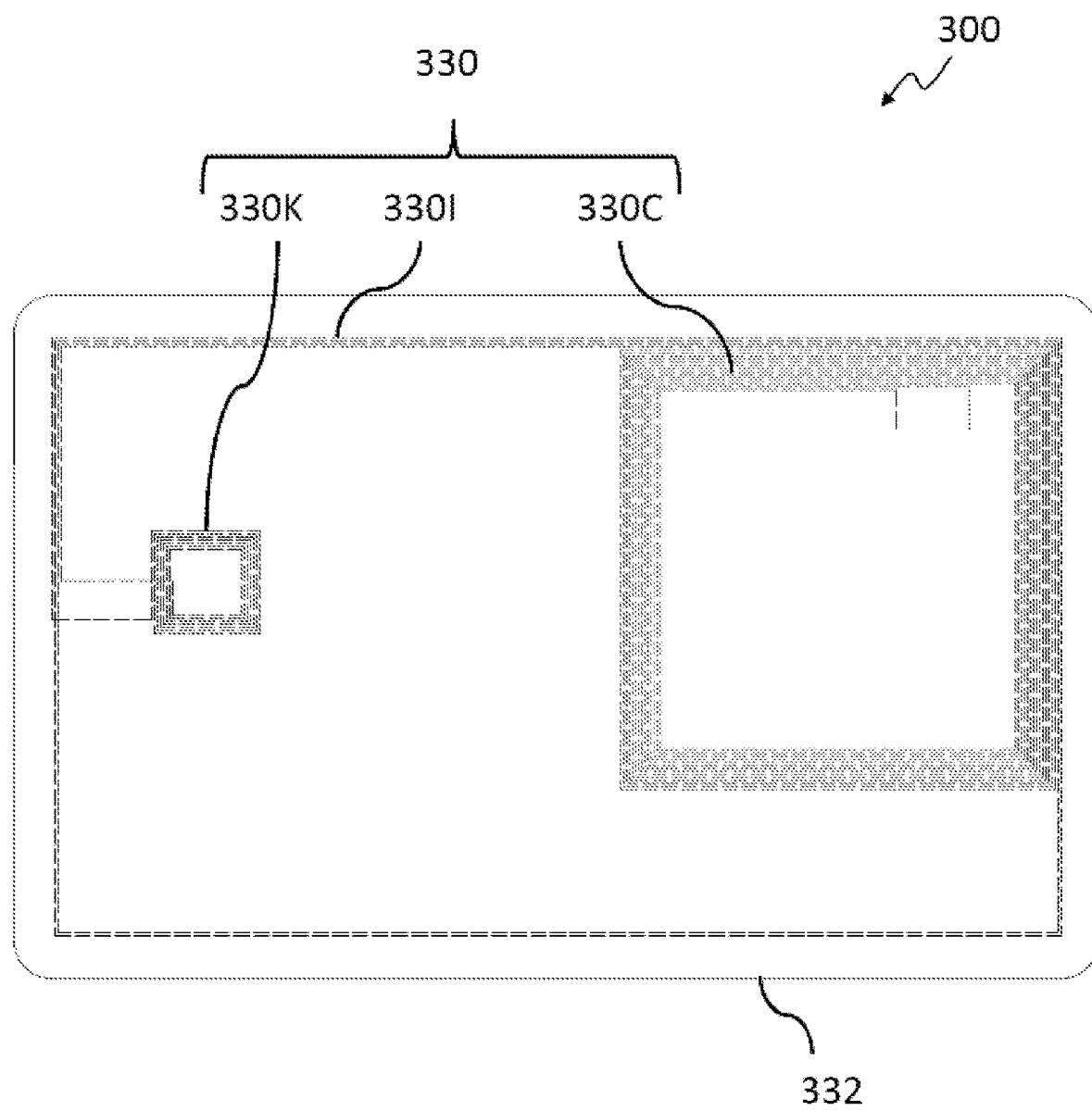
FIG. 3 shows a schematic top view of an antenna inlay of a chip card according to different aspects of the disclosure.
Figure 4A:
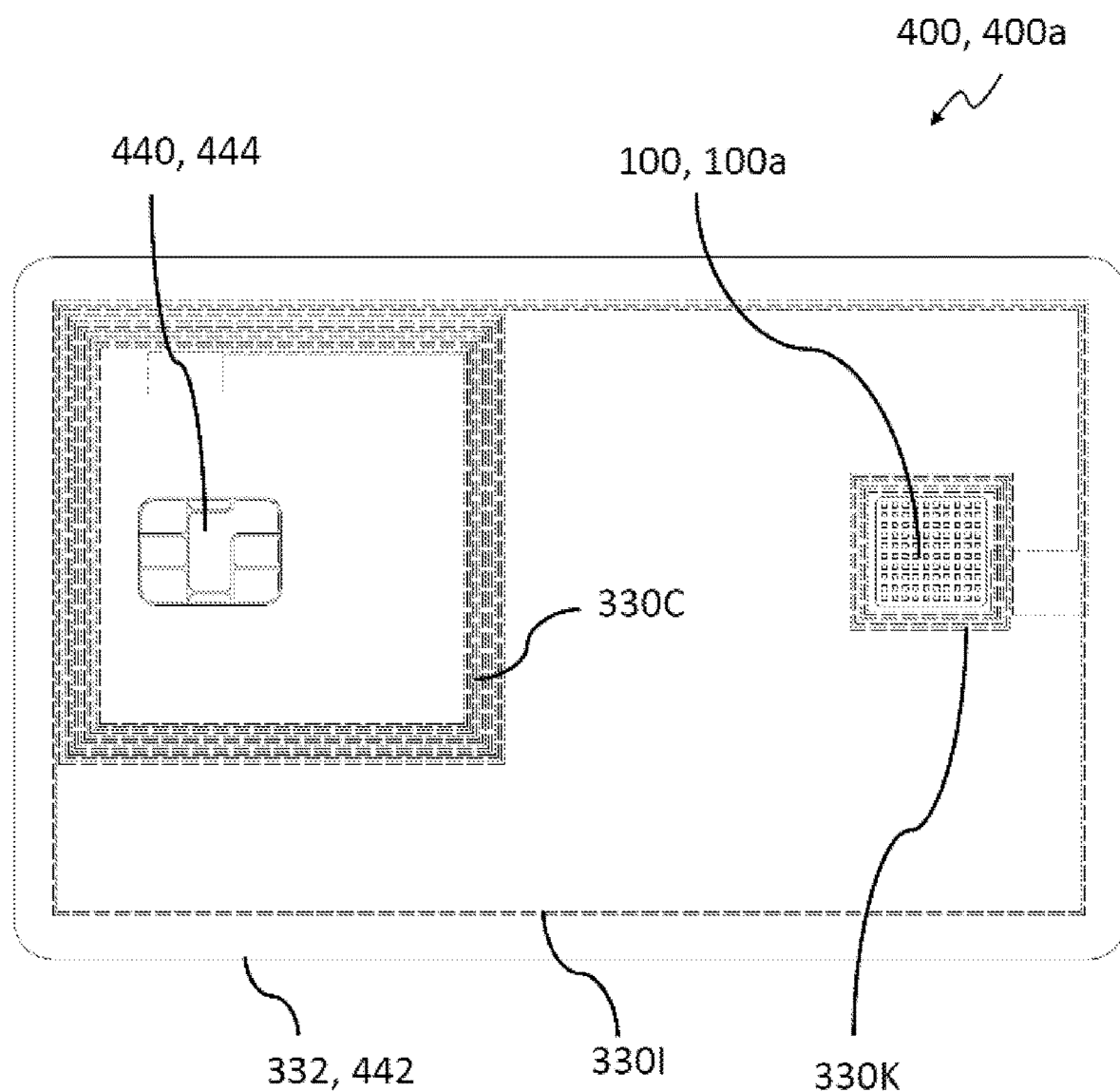
FIG. 4A shows a schematic top view of the front side of a chip card according to different aspects of the disclosure.

FIG. 1A shows schematic top views of the front side and rear side of a sensor device 100, 100*a* according to different aspects of the disclosure, while FIGS. 1B, 1C and 1D in each case show a schematic cross-section view of an example embodiment of the sensor device 100, 100*a* from FIG. 1A FIG. 2A shows a schematic top view of the front side of a sensor device 100, 100*b* according to different aspects of the disclosure, while FIGS. 2B and 2C in each case show a schematic cross-section view of an example embodiment of the sensor device 100, 100*b* from FIG. 2A. FIG. 3 shows a schematic top view of an antenna inlay 300 for use in a chip card 400 according to different aspects of the disclosure. FIG. 4A shows a schematic top view of the front side of a chip card 400, 400*a* according to different aspects of the disclosure, while FIGS. 4B and 4C in each case show a schematic cross-section view of an example embodiment of the chip card 400, 400*a* from FIG. 4A. FIGS. 5A and 5B in each case show a schematic top view of the front side of a chip card 400, 400*b* according to different aspects of the disclosure.

The sensor device 100 (see e.g. FIG. 1A to 1D and FIG. 2A to 2C) may include a fingerprint sensor 109 and an antenna 106 coupled with the fingerprint sensor 109 for inductive coupling of the fingerprint sensor 109 with a booster antenna 330 (which may form part of a chip card into which the sensor device 100 may be embedded, see e.g. FIGS. 3 to 5B). The antenna 106 may serve entirely or essentially entirely as a coupling area for coupling with the booster antenna 330, or may include a coupling area.

The fingerprint sensor 109 (sometimes also referred to below as the "sensor" for short) may be disposed on a front side F100 of the sensor device 100. The sensor 109 may include a multiplicity of touch-sensitive sensor pads 108 that are exposed or at most covered, e.g. with a thin protective layer 120, to the extent that their measurement sensitivity for fingerprints may be retained.

The sensor device 100 may also be referred to as the sensor module 100. For this reason, and due to the functionality provided by the sensor module in conjunction with the antenna 106, the sensor device 100 may be regarded as being of the coil-on-module (CoM) type.

The fingerprint sensor 109 may include a sensor surface with a multiplicity of sensor pads 108 that are arranged in rows and columns. The sensor pads 108 may thus form an X*Y sensor array for capturing fingerprints. A surface of the fingerprint sensor 109 may include a size in a range from around 80 mm$^2$ to around 150 mm$^2$.

In different aspects of the disclosure, a size of a surface of the entire sensor device 100, 100*a* may be only marginally larger than the sensor surface. In other aspects of the disclosure, the sensor device 100, 100*b* may additionally include an integrated contact module, so that a size of the surface of the entire sensor device 100, 100*b* may be slightly larger than a sum of the sensor surface and a contact surface of the contact module, e.g. an ISO 7816 contact module.

The antenna 106 may be disposed on or in a rear side B100 of the sensor device. In the right-hand view in FIG. 1A, the antenna 106 is shown according to different aspects of the disclosure by broken lines, and therefore covered or embedded, but, according to other aspects of the disclosure, it may also be exposed on the rear side B100.

The fingerprint sensor 109 may include a sensor chip 110 that may be configured to process captured sensor signals, for example to generate an image of the fingerprint from the sensor signals, or to perform a different standardized processing of the captured sensor signals that may be suitable for being compared with reference sensor signals.

The sensor chip 110 may be connected to the sensor pads 108 by a circuit that may include, for example, vertical contacts 118, signal layers 116, and chip connections 112.

The processed fingerprint signal may be provided for comparison with reference sensor (e.g. fingerprint) signals stored in the sensor device 100 or provided by an apparatus outside the sensor device, also referred to as an external reading device. The reference fingerprint signals stored in the sensor device 100 may be stored, for example, in a second chip 104 that may be configured as a secure element or security controller.

The second chip 104 may be configured for contactless communication with the apparatus outside the sensor device, wherein the antenna 106 may be connected in an electrically conducting manner to the second chip 104.

In different aspects of the disclosure, a comparison of the captured fingerprint with the reference sensor signals may be performed in the second chip 104 or, in different aspects of the disclosure, in the external reading device. If it is determined that the captured fingerprint matches a reference sensor signal, a required action may be enabled, for example a financial transaction may be enabled or an access may be granted.

The fingerprint sensor 109 may be coupled to the antenna 106 by a circuit that may include at least the chip 104. This is shown by way of example in FIG. 1B to 1D, FIGS. 2B and 2C and FIGS. 4B and 4C. The circuit may include parts of the circuit for connecting the sensor pads 108 to the sensor chip 110, for example a part of the signal layers 116 and/or a part of the vertical contacts 118, and may additionally include further circuit elements, for example further chip connections 112 and antenna connections 124.

Alternatively, or in addition to the security function, the second chip 104 may be configured to provide a power source function for the sensor 109. This means that the second chip 104 may be configured to process power that is fed to it via the antenna 106 connected to it in such a way that the second chip 104 itself and the fingerprint sensor 109 may be operated therewith.

In different aspects of the disclosure, a functionality of the sensor chip 110 may be provided by the second chip 104 so that the sensor device 100 includes only one chip 104.

In different aspects of the disclosure, a use of two separate chips 104, 110 for the different functions of the operation of the sensor and the external communication may be advantageous in that requirements for the performance (e.g. speed) of the sensor chip 110 are significantly less than the requirements for the second chip 104, thus enabling only the second chip 104 to be provided with a current, expensive technology, e.g. as 40 nm node chip, and a less expensive technology, e.g. a 180 nm node chip, to be used for the sensor chip.

In different aspects of the disclosure, the antenna 106 may include a surface area that may be smaller than or essentially identical to the surface area of a sensor surface of the fingerprint sensor 109. The antenna surface area may thus be maximized with a minimal total size of the sensor device 100. This is shown in FIG. 1A to 1D and in FIG. 2B.

The sensor device 100 may further include a contact-based interface 440 for contact-based communication. This is shown by way of example in FIG. 2A to 2C, FIG. 5A and FIG. 5B.

The fingerprint sensor 109 may therefore also be used for an authentication of information exchanged by the contact-based interface 440.

The contact-based interface 440 may be set up adjacent to the fingerprint sensor 109.

In the case of the sensor device 100, 100b, the integrated contact-based interface 440 may be connected by signal lines 226 to the circuit described above for the sensor device 100, 100a. The sensor device 100, 100b may be described by way of illustration as a sensor device 100, 100a extended laterally around the contact-based interface 440. In different aspects of the disclosure, the signal lines 226 may be part of the signal layers 116. The contact-based interface 440 may be connected to the signal lines 226 and therefore to the second chip 104 by vertical contacts 228.

In different aspects of the disclosure, a sensor device with contactless and contact-based functionality may be provided that requires only a single security chip 104 and is nevertheless robust.

All lines between the fingerprint sensor and the contact-based interface 440 run inside the sensor device 100, 100b, so that no additional, mechanically vulnerable connection lines may be required inside a chip card body.

According to different aspects of the disclosure, the sensor device 100 (both with the integrated contact-based interface 440 and without the contact-based interface 440), may be formed as a single integrated module 100.

In different aspects of the disclosure, the antenna 106 may include a surface area that is larger than the surface area of a sensor surface of the fingerprint sensor 109. The antenna 106 may be disposed, for example, below the sensor surface of the fingerprint sensor 109 and below the contact-based interface 440. This is shown by way of example in FIG. 2C.

In different aspects of the disclosure, the structure described above of the sensor device 100 may be produced using standard PCB processes for rigid and/or flexible PCBs. The processes may include, for example, additive and/or subtractive processes.

Conductor paths or conductive structured layers may typically be formed from copper (Cu). Other suitable electrically conductive materials may be used where appropriate.

A substrate material 114 that may form a body of the sensor device 100 may include or consist of a dielectric organic material. The substrate material 114 may include a reinforced material, wherein the reinforcement may include, for example, glass fibers or a different dielectric (filling) material.

The sensor pads 108 that may be disposed in a sensor element layer, the signal layers 116, 226 and the antenna 106 that may be part of an antenna layer may be interconnected by the vertical contacts 118, 124, 228, for example plated vias.

The chips 104, 110 (or in the case of only one chip, the chip 104) may be embedded in the PCB structure. A corresponding method is usually referred to as "chip embedding in PCB".

The chips 104, 110 are connected to the PCB structures by galvanic connections, for example by plated blind vias, solder connections or by anisotropic conductive adhesives (ACA, ACP).

The embedding of the chip(s) 104, 110 may enable the sensor device to be designed as compact and robust with a smooth external contour.

Nevertheless, in different aspects of the disclosure, the chips 104, 110 may be fitted by a surface mounting (surface mount device, SMD) or as a flipchip apparatus on the rear side of the module 100, for example on the antenna layer, e.g. in an internal area of the sensor module 100 that may be surrounded by the antenna 106.

The antenna layer may be embedded into the substrate material 114 of the sensor module 100, for example by known antenna embedding methods. This is shown by way of example in FIGS. 1B, 1C, 1D, 2B, 4B and 4C.

Alternatively, the antenna layer may form the outermost (lowermost) layer of the sensor module 100 in such a way that its metal is exposed.

As a further alternative, the antenna layer may initially be formed as the outermost (lowermost) layer, but may then also be provided with a further layer, e.g. a solder layer or a protective layer.

In different aspects of the disclosure, the sensor device 100 may further include a shielding 122 disposed between the fingerprint sensor 109 and the antenna 106. This is shown by way of example in FIG. 1C.

The shielding 122 may include, for example, or be formed from ferrite. As a result, the antenna 109 may be shielded from the fingerprint sensor 109 and contactless operation of the sensor device 100 may thus be improved.

The shielding 122 may, for example, alternatively or additionally, include or be formed from an electrically conductive layer that may be connected to ground potential. As a result, an influence of the contactless operation on signals that may be captured by the fingerprint sensor 109 may be minimized (e.g. incorrect sensor values due to interference with the contactless signal are prevented), and operation of the sensor device 100 may thus be improved.

Either the ferrite shielding or the grounded shielding or a combination of both may be used depending on requirements.

Vertical lines 124 may be fed through the shielding 122.

In different aspects of the disclosure, the sensor device 100 may further include at least one embedded additional component 126. This is shown by way of example in FIG. 1D.

The additional component 126 may include or be, for example, at least one LED that may signal a transaction (e.g. green or red for a successful or failed authentication or similar).

The additional component 126 may include, for example, passive components for an antenna matching, e.g. an (e.g. parallel or serial) capacitor, or further passive components such as resistors and/or inductors.

A plurality of additional components 126 may be combined with one another, e.g. one or more LEDs and capacitors for an antenna matching or similar.

In different aspects of the disclosure, a connection of the additional component 126 may be established at least partially by the existing circuit and may include further lines (e.g. conductor paths, through-connections/vias) that are or may be formed as described above.

Figure 4B:
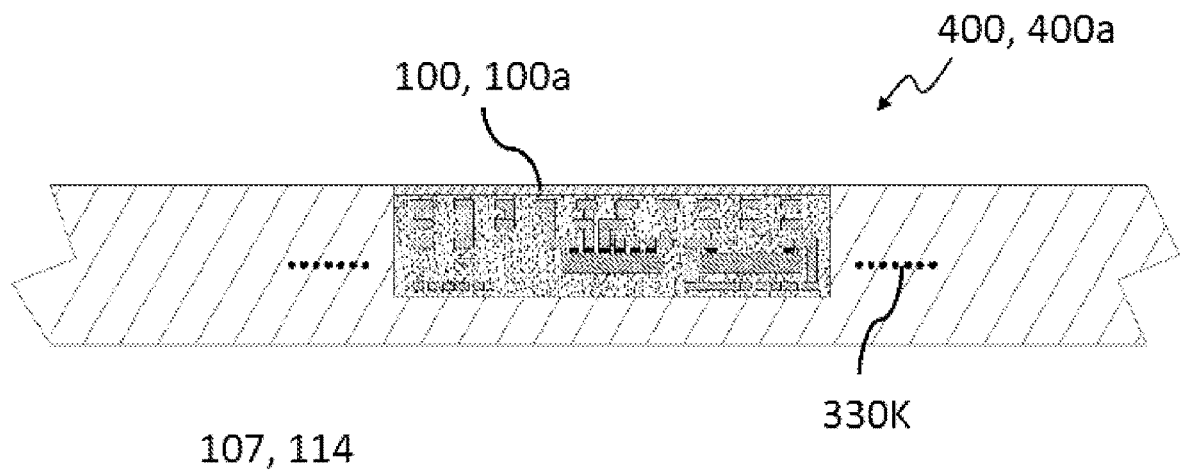
FIGS. 4B and 4C in each case show a schematic cross-section view of an example embodiment of the chip card from FIG. 4A.
Figure 4C:
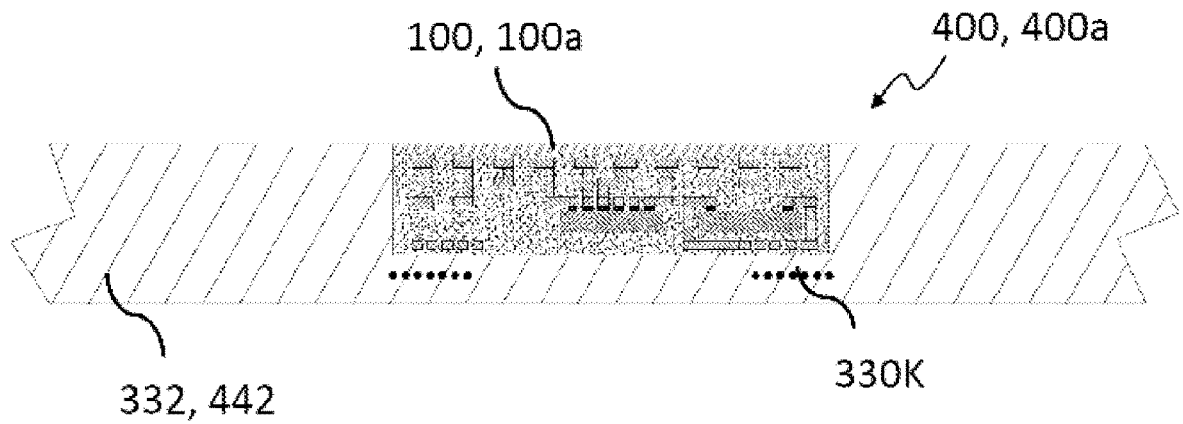
Figure 5A:
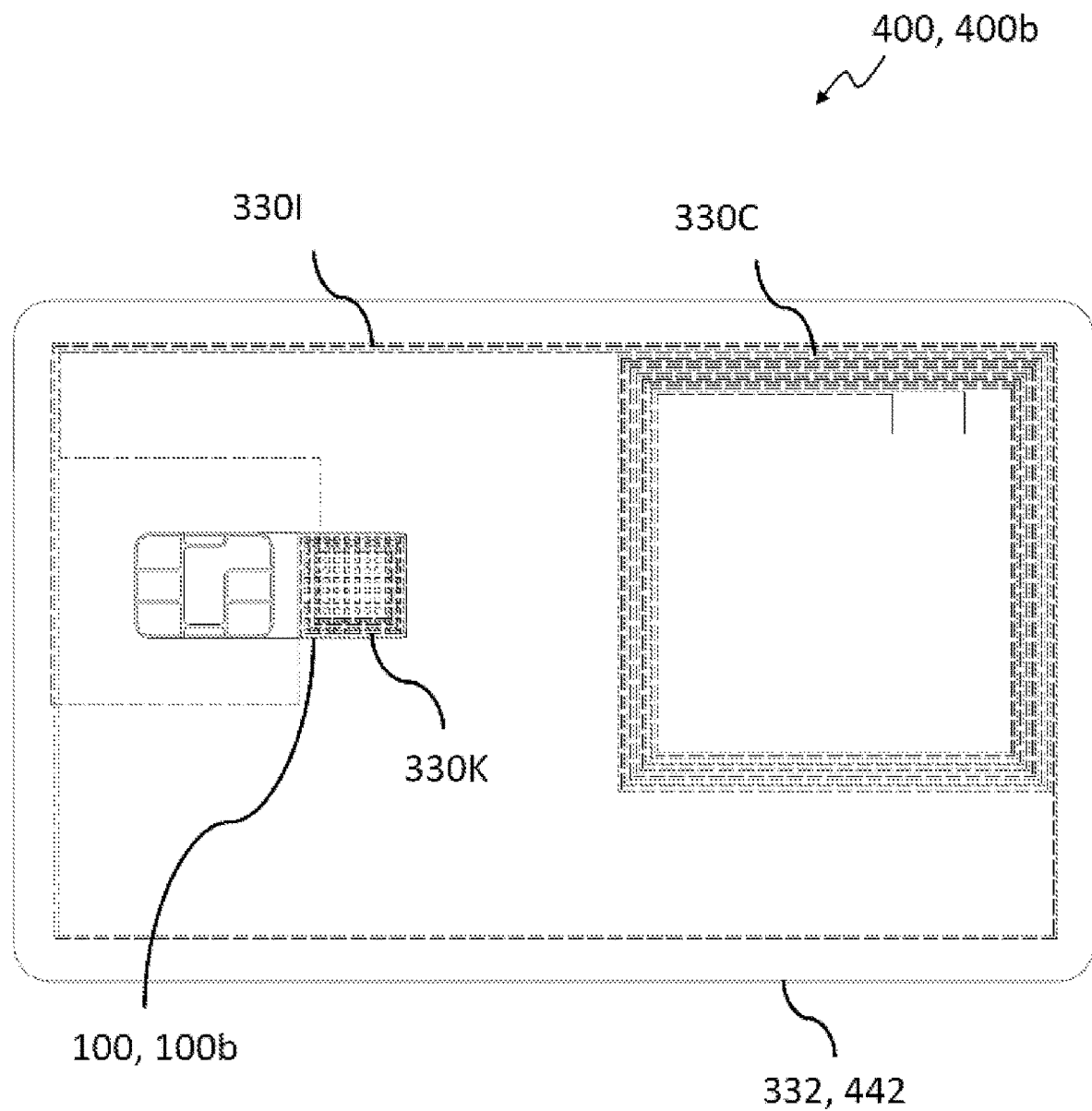
FIGS. 5A and 5B in each case show a schematic top view of the front side of a chip card according to different aspects of the disclosure.
Figure 5B:
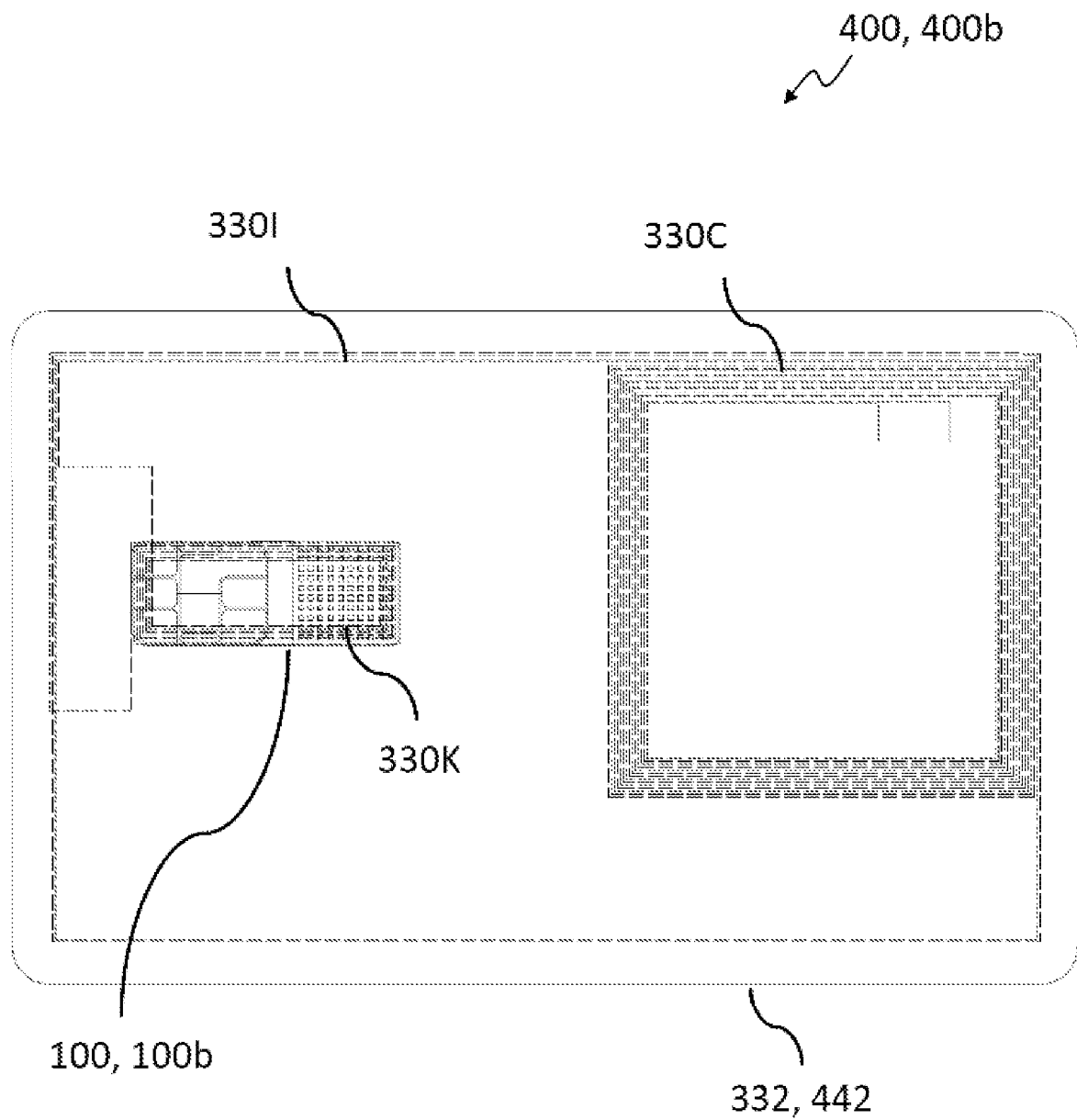

FIG. 3 shows a schematic top view of an antenna inlay 300 of a chip card 400 according to different aspects of the disclosure, FIG. 4A shows a schematic top view of the front side of a chip card 400 according to different aspects of the disclosure, FIGS. 4B and 4C in each case show a schematic cross-section view of an aspect of the disclosure of the chip card from FIG. 4A, and FIGS. 5A and 5B in each case show a schematic top view of the front side of a chip card 400 according to different aspects of the disclosure.

In different aspects of the disclosure, the antenna inlay 300 may include an antenna support 332 and the booster antenna 330.

As is known from CoM applications, the booster antenna 330 may include different conductively interconnected areas, for example a coupling area 330K for inductive coupling with the sensor module 100, i.e. with the antenna 106 of the sensor module 100, an inductive area 3001 for inductive coupling with the apparatus outside the sensor device, and an (optional) capacitive area 330C for a matching of the booster antenna 330. The capacitive area 330C may be integrated into external windings or may be formed as a separate block anywhere in the card area.

All presently conventional antenna formats may be implemented, e.g. (according to the conventional designations) ID1, full size, ⅔ or half size.

Conventional processes, e.g. wire embedding, aluminum etching, copper coating, etc., may be used for production.

The antenna inlay 300 may be combined in a known manner, for example laminated, with further layers 442 to form a chip card body 332, 442.

An insertion, e.g. implanting, of the sensor device 100 into the chip card body 332, 442 may be performed by essentially known processes, e.g. by a hotmelt process.

The chip card 400 formed by the implanting may accordingly include the chip card body 332, 442 with the booster antenna 330 and the sensor device 100 embedded into the chip card body 400 according to one of the above aspects of the disclosure.

The sensor device 100 may be disposed in the chip card body 332, 442 in such a way that its antenna 106 may inductively couple with the coupling area 330K of the booster antenna 330.

In different aspects of the disclosure, the coupling area 330K may be configured in such a way that it is disposed in a lateral direction around the sensor device 100, as shown in FIG. 4A and FIG. 4B for the chip card 400, 400a. This may enable the antenna 330 to be disposed vertically approximately centrally in the chip card 400.

In different aspects of the disclosure, the coupling area 330K may be disposed below the sensor device 100, as shown in FIG. 4C. This may enable the coupling area 330K of the booster antenna 330 to be disposed as close as possible to the antenna 106 and therefore the strength of the inductive coupling to be increased.

In different aspects of the disclosure, for example using the sensor device 100, 100b, the chip card 400 may be provided as a dual-interface chip card 400b that may enable both contact-based and contactless communication.

In this case, the fingerprint sensor 109 may also be used for an authentication of information exchanged through the contact-based interface 440.

The contact-based interface 440 may be disposed between the fingerprint sensor 109 and an edge of the chip card 400 so that the fingerprint sensor 109 may be exposed for use even if the contact-based interface is inserted into a contact-based reading device.

In the case of the dual-mode sensor device 100, 100b, the coupling area 330K of the booster antenna 330 may be disposed in such a way that it is located only below the fingerprint sensor 109 (see FIG. 5A), or in such a way that it may similarly extend below the contact-based area of the sensor device 100, 100b (see FIG. 5B), or around the entire sensor device 100 (not shown), in each case corresponding to the antenna 106 in the sensor device 100. A larger coupling area may offer better performance in the contactless communication.

In different aspects of the disclosure, the sensor device may be formed as a pure contactless sensor device 100, 100a. In this case, a contact-based communication of the chip card 400, 400k may be enabled if required by disposing an (e.g. conventional) chip card module 444, e.g. with the contact-based interface 440 according to ISO 7816, in the chip card body 332, 442. The contact-based chip card module 444 may include a further chip coupled in an electrically conductive manner. This is shown in FIG. 4A (wherein the further chip is not shown).

In different aspects of the disclosure, a plug-and-play version of a sensor device 100 or of a corresponding chip card 400 may be provided in which the sensor device 100 may be easily integrable into the chip card body 332, 442 in order to form the fingerprint sensor card 400. No electrically conductive connections between the sensor module 100 and the booster antenna 330 may be required here.

FIG. 6 is a flow diagram 600 of a method of forming a sensor device according to different aspects of the disclosure.

The method may include providing a fingerprint sensor (at 610). The method may further include coupling a fingerprint sensor with an antenna for inductive coupling of the fingerprint sensor with a booster antenna on provision of a fingerprint sensor (at 620).

FIG. 7 is a flow diagram 700 of a method of forming a sensor device according to different aspects of the disclosure.

The method may include disposing a booster antenna having a coupling area for inductive coupling with an antenna of a sensor device into a chip card body (710) and embedding a booster antenna having a coupling area for inductive coupling with an antenna of a sensor device into the chip card body (720).

To summarize, some aspects of the disclosure are indicated below.

Example 1 is a sensor device. The sensor device may include a fingerprint sensor and an antenna coupled with the fingerprint sensor for inductive coupling of the fingerprint sensor with a booster antenna.

Example 2 is a sensor device according to example 1, wherein the fingerprint sensor may include a sensor surface with a multiplicity of sensor pads.

Example 3 is a sensor device according to example 2, wherein the sensor pads may be arranged in rows and columns.

Example 4 is a sensor device according to one of examples 1 to 3, wherein the fingerprint sensor may include a sensor chip configured to process captured sensor signals.

Example 5 is a sensor device according to example 4 that may further include a second chip, wherein the second chip may be configured to communicate with an apparatus outside the sensor device, wherein the antenna may be connected in an electrically conducting manner to the second chip.

Example 6 is a sensor device according to example 5, wherein the second chip may be configured as a secure element.

Example 7 is a sensor device according to one of examples 1 to 6, which may be configured as a coil-on-module device.

Example 8 is a sensor device according to one of examples 1 to 7, wherein the antenna may have a surface area that is smaller than or essentially identical to the surface area of a sensor surface of the fingerprint sensor.

Example 9 is a sensor device according to one of examples 1 to 8 that may further include a contact-based interface for contact-based communication.

Example 10 is a sensor device according to one of examples 1 to 9, wherein the sensor device may be formed as a single integrated module.

Example 11 is a sensor device according to example 9 or 10, wherein the antenna may be disposed below the sensor surface of the fingerprint sensor and below the contact-based interface.

Example 12 is a sensor device according to one of examples 1 to 11 that may further include a shielding disposed between the fingerprint sensor and the antenna.

Example 13 is a sensor device according to example 12, wherein the shielding may include ferrite and/or may be connected to ground potential.

Example 14 is a sensor device according to one of examples 1 to 13 that may further include at least one embedded additional component, wherein the additional component may include one component from a list of components, said list including: an LED, a capacitor, a resistor and an inductor.

Example 15 is a chip card. The chip card may include a chip card body, a sensor device according to one of examples 1 to 13 embedded into the chip card body, and a booster antenna embedded into the chip card body and including a coupling area for inductive coupling with the antenna of the sensor device.

Example 16 is a chip card according to example 15, wherein the coupling area may be disposed around the sensor device.

Example 17 is a chip card according to example 15, wherein the coupling area may be disposed below the antenna of the sensor device.

Example 18 is a chip card according to one of examples 15 to 17, wherein the sensor device may be formed according to one of examples 9 to 14, and wherein the chip card may further include a further chip disposed in the chip card body and coupled in an electrically conductive manner with the contact-based interface.

Example 19 is a method of forming a sensor device. The method may include coupling a fingerprint sensor with an antenna for inductive coupling of the fingerprint sensor with a booster antenna.

Example 20 is a method according to example 19 that may further include embedding the antenna into a sensor device body prior to the coupling.

Example 21 is a method according to example 19 or 20, wherein the coupling of the antenna to the fingerprint sensor may include an electrically conductive connection.

Example 22 is a method according to example 20 or 21, wherein the fingerprint sensor may be attached to the sensor device body during the coupling.

Example 23 is a method according to one of examples 19 to 22, wherein the fingerprint sensor may be coupled with the antenna by a circuit that may include at least one chip.

Example 24 is a method of forming a chip card. The method may include embedding a booster antenna having a coupling area for inductive coupling with an antenna of a sensor device into a chip card body and inserting a sensor device according to one of examples 1 to 13 into the chip card body.

Further advantageous designs of the device are set out in the description of the method and vice versa.

What is claimed is:

1. A sensor device, comprising:
   a first chip configured as a fingerprint sensor;
   an antenna coupled with the fingerprint sensor for inductive coupling of the fingerprint sensor with a booster antenna; and a second chip;
wherein the second chip is configured for contactless communication with an apparatus outside the sensor device, wherein the antenna is connected in an electrically conducting manner to the second chip;
wherein the second chip is a security controller, in which a reference fingerprint for user authentication is stored;
wherein the first chip is configured to detect with the fingerprint sensor a user fingerprint and to send a signal representing the detected user fingerprint to the second chip; and wherein the second chip is configured to authenticate the user based on the detected user fingerprint and the reference fingerprint.

2. The sensor device as claimed in claim 1,
wherein the fingerprint sensor comprises a sensor surface with a multiplicity of sensor pads.

3. The sensor device as claimed in claim 1,
wherein the fingerprint sensor comprises a sensor chip configured to process captured sensor signals.

4. The sensor device as claimed in claim 1,
wherein the sensor device is configured as a coil-on-module device.

5. The sensor device as claimed in claim 1,
wherein the antenna has a surface area that is smaller than or essentially identical to the surface area of a sensor surface of the fingerprint sensor.

6. The sensor device as claimed in claim 1, further comprising:
a contact-based interface for contact-based communication.

7. The sensor device as claimed in claim 6,
wherein the antenna is disposed below the sensor surface of the fingerprint sensor and below the contact-based interface.

8. The sensor device as claimed in claim 1,
wherein the sensor device is formed as a single integrated module.

9. The sensor device as claimed in claim 1, further comprising:
a shielding disposed between the fingerprint sensor and the antenna.

10. The sensor device as claimed in claim 9,
wherein the shielding comprises ferrite and/or is connected to ground potential.

11. A chip card, comprising:
a chip card body,
a first chip configured as a sensor device embedded into the chip card body, the sensor device comprising:
a fingerprint sensor; and
an antenna coupled with the fingerprint sensor for inductive coupling of the fingerprint sensor with a booster antenna;
the booster antenna embedded into the chip card body and comprising a coupling area for inductive coupling with the antenna of the sensor device; and
a second chip;
wherein the second chip is configured for contactless communication with an apparatus outside the sensor device, wherein the antenna is connected in an electrically conducting manner to the second chip;
wherein the second chip is a security controller, in which a reference fingerprint for user authentication is stored;
wherein the first chip is configured to detect with the fingerprint sensor a user fingerprint and to send a signal representing the detected user fingerprint to the second chip; and wherein the second chip is configured to authenticate the user based on the detected user fingerprint and the reference fingerprint.

12. The chip card as claimed in claim 11,
wherein the coupling area is disposed around the sensor device.

13. The chip card as claimed in claim 11,
wherein the coupling area is disposed below the antenna of the sensor device.

14. The chip card as claimed in claim 11,
further comprising:
a contact-based interface for contact-based communication; and
a further chip disposed in the chip card body and coupled in an electrically conductive manner with the contact-based interface.

15. A method of forming a sensor device, comprising:
coupling a first chip configured as a fingerprint sensor with an antenna for inductive coupling of the fingerprint sensor with a booster antenna;
embedding the antenna into a sensor device body prior to the coupling, the sensor device further comprising a second chip, wherein the second chip is configured for contactless communication with an apparatus outside the sensor device, wherein the antenna is connected in an electrically conducting manner to the second chip;
wherein the second chip is a security controller, in which a reference fingerprint for user authentication is stored;
further comprising detecting with the fingerprint sensor a user fingerprint and sending a signal representing the detected user fingerprint to the second chip; and wherein the second chip is configured to authenticate the user based on the detected user fingerprint and the reference fingerprint.

* * * * *